April 9, 1968     E. G. PIPER     3,377,020
CALCIUM SULPHATE CENTRIFUGING
Filed March 16, 1966
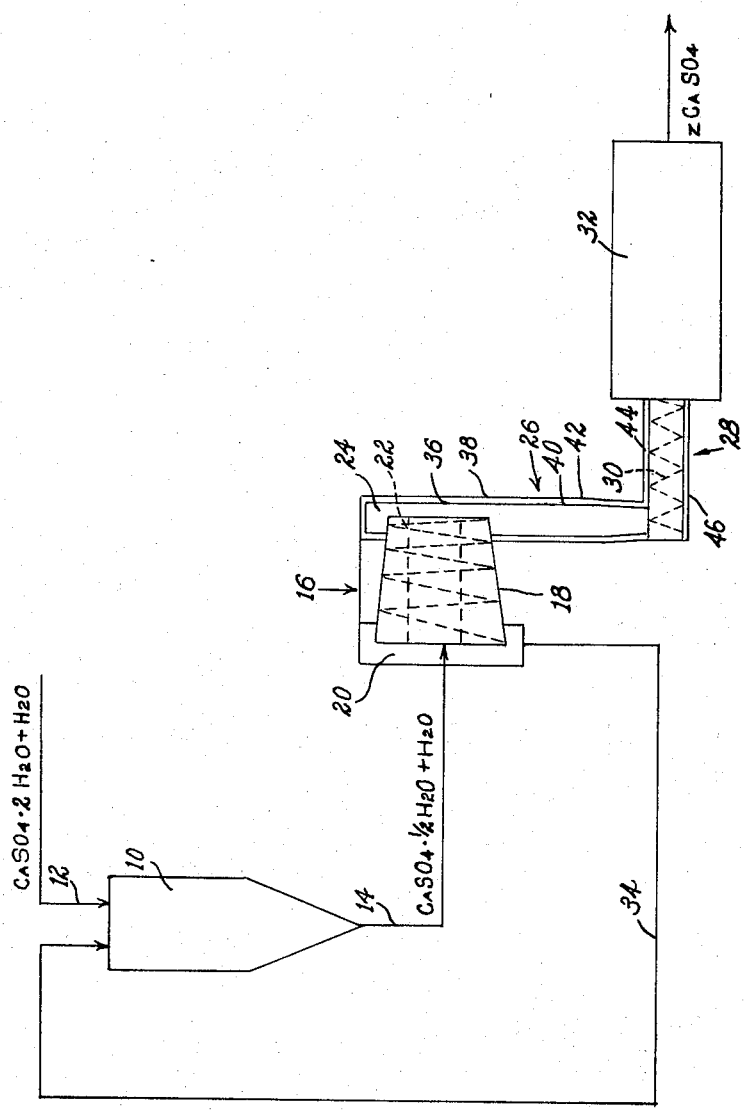

United States Patent Office 3,377,020
Patented Apr. 9, 1968

3,377,020
CALCIUM SULPHATE CENTRIFUGING
Eric G. Piper, Dover, Mass., assignor to Bird Machine Company, South Walpole, Mass., a corporation of Massachusetts
Filed Mar. 16, 1966, Ser. No. 534,880
3 Claims. (Cl. 233—11)

This invention relates to a process for separating liquid from a suspension therein of calcium sulphate hemi-hydrate ($CaSO_4 \cdot \tfrac{1}{2} H_2O$). The invention particularly concerns such a process in which the major mechanical separation is effected in a centrifuge of the continuous type, such as a solid bowl continuous centrifuge.

Mechanical deliquoring of calcium sulphate hemi-hydrate slurry is one of the major steps in the autoclave process for converting gypsum to the hemi-hydrate. In this process, a slurry of gypsum in water is treated in an autoclave under high pressure and temperature conditions (e.g. 50 p.s.i. 298° F.) until it is converted to an aqueous slurry of calcium sulphate hemi-hydrate. The hemi-hydrate slurry is then subjected to mechanical dewatering and thermal drying to produce the desired dried product.

Mechanical deliquoring of such slurry is also an important step in processes for the production of so-called "wet process" phosphoric acid. In such processes, phosphate rock and sulphuric acid are reacted under high temperature and pressure conditions, the reaction being controlled to produce an unstable hemi-hydrate form of calcium sulphate solids in an aqueous phosphoric acid solution. These unstable hemi-hydrate solids are then deliquored and reslurried in a more dilute solution of phosphoric acid and this slurry is cooled to a lower temperature to recrystallize the hemi-hydrate solids in a dihydrate form (gypsum) of calcium sulphate. In such processes it is necessary that the hemi-hydrate solids produced in the first stage be relatively unstable for recrystallization to the dihydrate form of calcium sulphate to take place after reslurrying in a reasonable or practical period of time.

The calcium sulphate hemi-hydrate of these liquors or acid suspensions is unstable and has a tendency to revert to gypsum if the temperature of the slurry is allowed to fall below its critical temperature of inversion. As a practical matter, the mechanical deliquoring of such slurries must usually be carried out at atmospheric pressure. When the slurry is discharged from the high pressure, high temperature conditions of its preparation to the atmospheric deliquoring system it flash vaporizes and quickly cools to or below its boiling point. It is therefore important that mechanical deliquoring before thermal drying or reslurrying takes place rapidly, and a continuous centrifuge, because of the speed and efficiency of its action, is ideal for the purpose from this standpoint.

However, attempts to use such centrifuges for deliquoring such slurries have encountered serious difficulty with clogging of the solids discharge compartment with caked solids which rapidly build up on the walls of the compartment to such an extent as seriously to interfere with the centrifuge operation. These caked solids are hard and cement-like in character. Their presence causes the centrifuge bowl, plows and other rotating parts to bind, which results in excessive power demand and can also lead to excessive wear and maintenance costs. Frequent cleaning of the discharge compartment is therefore necessary and this, because of the cement-like, strongly adherent nature of the solids accumulation, requires disassembly of the centrifuge case to expose the solids discharge compartment and scraping or chipping out the accumulation, at considerable inconvenience and intolerable loss of operating time.

The present invention has for its object to solve, and does in fact solve, the aforesaid problems by applying heat to the solids discharge compartment of the centrifuge, preferably through the walls thereof, sufficient to heat the surfaces on which solids may accumulate to a temperature above the critical inversion temperature of the slurry.

Apparently, the nature of the caked solids accumulation and its rapid buildup heretofore encountered were occasioned by chemical change of the hemi-hydrate particles thereof to the dihydrate, even though this reaction did not take place to any significant extent in the bulk of the solids moving to the dryer or to reslurrying. It is believed that the constant relative motion of the bulk of the hemi-hydrate particles moving to the next stage treatment prevented this chemical conversion or inversion from taking place. On the other hand particles striking the wall of the case generally contain sufficient surface moisture for some of them to adhere to the case surface. Those particles which adhere are supplied with additional moisture from the impact of later particles which transfers some of the surface moisture from the later particles to the first particles to adhere. The surface moisture which is transformed by impact provides the water necessary to hydrate the particles which have adhered to the case wall and cement them to each other and to the case wall. This process of first adhesion and then cementing continues to build up the hard, cement-like cake on the case wall.

The heating of the present invention is believed to function by preferentially, substantially immediately heating those particles deposited on the walls to a temperature above that at which conversion to gypsum can take place, rather than by heating the bulk of the solids, which are only momentarily exposed to the heated interior of the solids compartment as they pass through it. Thus, these preferentially heated solids which collect on the walls retain their discrete hemi-hydrate particulate form, in which they are relatively non-adherent to the walls and to each other, and are readily scrubbed off by the continued impact thereon of further solids. Any cake which does form is relatively soft and readily removed, as by flushing.

The critical inversion temperature for calcium sulphate hemi-hydrate slurry in pure water at atmospheric pressure is 226° F., and this will normally be the approximate inversion temperature of the slurry to be centrifuged from the autoclave process of inverting an aqueous slurry of gypsum to the hemi-hydrate. However, the slurry to be centrifuged in the wet process of phosphoric acid production contains a substantial percentage of phosphoric acid, in the range of about 26% to 45%, the effect of which is to lower the critical temperature of inversion below 226° F. at an increasing rate with increasing acid concentration. The critical inversion temperature curve at atmospheric pressure for aqueous calcium sulphate hemi-hydrate slurry having from 0 to 50% phosphoric acid concentration is shown as the lower solid line curve on the graph at page 181 of vol. III, "Fertilizer Technology and Resources in the United States," K. D. Jacob, 1953.

In the preferred practice of the invention sufficient heat is applied to maintain the casing walls at a temperature above the boiling point of the liquid phase of the slurry, for example 20° F. to 25° F. above that point. In the case of pure aqueous slurry the boiling point is slightly below the critical inversion temperature, whereas in the phosphoric acid liquor slurries of the acid concentrations here concerned the boiling point is above the critical inversion temperature, as shown by the dotted line curve on the graph mentioned above. Where the solids are conveyed to the next stage via a chute or conveyor or both, it will generally be desirable to apply heat to the walls thereof also, as the same problem may occur in the conveying equipment although to a substantially lesser extent.

The accompanying drawing is a flowsheet diagrammatically illustrating a preferred practice of the process in an autoclave method for producing dry calcium sulphate hemi-hydrate.

In the drawing, an autoclave is indicated at 10 which is supplied through feed pipeline 12 with a slurry of gypsum in water. In the autoclave the slurry is subjected to elevated temperature and pressure which may be approximately 250° F. and 50 p.s.i. respectively, until the gypsum slurry is converted to a slurry of calcium sulphate hemi-hydrate. The hemi-hydrate slurry is discharged from the autoclave to atmospheric pressure, causing flash vaporizing of water of the slurry and cooling of the slurry to approximately the boiling point of water at atmospheric pressure.

The slurry discharged from the autoclave is fed via pipeline 14 to a continuous centrifuge, indicated as a solid bowl or scroll type continuous centrifuge 16 having a rotating bowl 18 wherein the bulk of the water is separated from the solids and discharged to an effluent compartment 20 at one end of the centrifuge casing. The solids concentrated at the bowl wall by centrifugal force are moved by a rotating conveyor or scroll 22 to the opposite end of the bowl and are discharged into a solids compartment 24.

The bottom of compartment 24 opens into a chute 26 which at its base discharges to a tubular conveyor 28 having a rotating scroll 30 which feeds the solids into a thermal dryer 32 wherein the residual free water is removed to provide the desired dry hemi-hydrate product. The effluent from the centrifuge may be recycled as shown, or discarded, via pipeline 34.

In accordance with the invention the solids discharge compartment 24 of the centrifuge casing is heated so that the inner wall thereof and any other surfaces therein are heated to a temperature above the critical temperature of inversion. Preferably this is accomplished by providing this compartment with spaced inner and outer walls, as indicated at 36, 38 respectively in the drawing, and either circulating in the space between the walls a suitable heating medium such as super-heated stem, oil or other heating fluid, or by providing in said space heaters such as electric resistance heaters. Preferably also the outer wall will be covered with heat shielding. According to the preferred practice, inner and outer walls 40, 42 are provided for chute 26 and such walls 44, 46 for conveyor 28, with similar heating fluid or devices in the space between them to heat the inner walls to the desired temperature. As previously indicated, sufficient heat is supplied to maintain the inner wall at a temperature substantially above the critical inversion temperature, particularly in the solids compartment.

It will be understood that the process is utilized to like advantage in deliquoring an aqueous phosphoric acid slurry of calcium sulphate in connection with phosphoric acid production. In such case, the source of the slurry is the first stage of the phosphoric acid production process and the thermal dryer is replaced by reslurrying equipment.

I claim:
1. A process of deliquoring a slurry of calcium sulphate hemi-hydrate which comprises subjecting the slurry at a temperature below its critical inversion temperature to a centrifuging operation in which a partially dry solids fraction is continuously separated from the liquid fraction and discharged to a solids receiving compartment and supplying heat to said compartment sufficient to maintain the interior wall surfaces thereof at a temperature above said critical inversion temperature.

2. A process according to claim 1 wherein said wall surfaces are maintained at a temperature above the boiling point of the liquid phase of the slurry.

3. A process according to claim 1 which comprises conveying the solids away from said compartment for further treatment and maintaining the inner wall surfaces of the conveying equipment at a temperature above said critical inversion temperature.

References Cited
UNITED STATES PATENTS

| | | | |
|---|---|---|---|
| 1,798,857 | 3/1931 | Tyler | 23—122 |
| 2,247,221 | 6/1941 | Dailey | 263—53 XR |
| 3,211,369 | 10/1965 | Jones et al. | 233—7 |

FOREIGN PATENTS 759,259  10/1956  Great Britain.

HENRY T. KLINSIEK, *Primary Examiner.*